US008041572B2

(12) United States Patent
Da Palma et al.

(10) Patent No.: US 8,041,572 B2
(45) Date of Patent: *Oct. 18, 2011

(54) SPEECH PROCESSING METHOD BASED UPON A REPRESENTATIONAL STATE TRANSFER (REST) ARCHITECTURE THAT USES WEB 2.0 CONCEPTS FOR SPEECH RESOURCE INTERFACES (75) Inventors: William V. Da Palma, Coconut Creek, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1154 days.

This patent is subject to a terminal disclaimer.

(21) Appl. No.: 11/765,928

(22) Filed: Jun. 20, 2007

(65) Prior Publication Data
US 2008/0319761 A1 Dec. 25, 2008

(51) Int. Cl.
*G10L 21/00* (2006.01)
(52) U.S. Cl. .................. 704/270; 704/270.1; 704/275
(58) Field of Classification Search .................. 704/7, 9, 704/270, 270.1, 200, 3, 258, 278, 275, 277, 704/276; 707/102; 709/246, 217
See application file for complete search history.

(56) References Cited

U.S. PATENT DOCUMENTS

| 6,314,402 B1 | 11/2001 | Monaco et al. |
| 6,324,511 B1 | 11/2001 | Kiraly et al. |
| 6,442,577 B1 | 8/2002 | Britton et al. |
| 6,636,831 B1 | 10/2003 | Profit, Jr. et al. |
| 6,801,604 B2 | 10/2004 | Maes et al. |
| 6,865,599 B2 | 3/2005 | Zhang |
| 7,143,148 B1 | 11/2006 | Hickman et al. |
| 7,334,050 B2 * | 2/2008 | Zondervan et al. ........... 709/246 |
| 7,581,166 B2 | 8/2009 | Renger et al. |
| 7,631,104 B2 | 12/2009 | Da Palma et al. |
| 7,673,017 B2 | 3/2010 | Kim et al. |

(Continued)

FOREIGN PATENT DOCUMENTS

WO 2005011921 12/2005

OTHER PUBLICATIONS http://www.networkworld.com/ee/2003/eerest.html.*

(Continued)

*Primary Examiner* — Huyen X. Vo
(74) *Attorney, Agent, or Firm* — Patents on Demand, P.A.; Brian K. Buchheit; Scott M. Garrett (57) ABSTRACT The present invention discloses a method of performing speech processing operations based upon Web 2.0 type interfaces with speech engines. The method can include a step of interfacing with a Web 2.0 server from a standard browser. A speech-enabled application served by the Web 2.0 server can be accessed. The browser can render markup of the speech-enabled application. Speech input can be received from a user of the browser. A RESTful protocol, such as the ATOM Publishing Protocol (APP), can be utilized to access a remotely located speech engine. The speech engine can accept GET, PUT, POST, and DELETE commands. The speech processing engine can process the speech input and can provide results to the Web 2.0 server. The Web 2.0 server can perform a programmatic action based upon the provided results, which results in different content being presented in the browser.

20 Claims, 4 Drawing Sheets

U.S. PATENT DOCUMENTS

| | | |
|---|---|---|
| 2002/0010756 A1 | 1/2002 | Oku |
| 2002/0052747 A1 | 5/2002 | Sarukkai |
| 2003/0055884 A1 | 3/2003 | Yuen et al. |
| 2003/0088421 A1 | 5/2003 | Maes et al. |
| 2003/0139928 A1 | 7/2003 | Krupatkin et al. |
| 2003/0177010 A1 | 9/2003 | Locke |
| 2005/0132056 A1 | 6/2005 | Creamer et al. |
| 2006/0004700 A1 | 1/2006 | Hofmann et al. |
| 2006/0015335 A1 | 1/2006 | Vennelakanti et al. |
| 2006/0195328 A1 | 8/2006 | Abraham et al. |
| 2007/0078884 A1* | 4/2007 | Ott et al. ............ 707/102 |
| 2008/0034056 A1* | 2/2008 | Renger et al. ............ 709/217 |
| 2008/0086689 A1 | 4/2008 | Berkley et al. |
| 2008/0242221 A1 | 10/2008 | Shapiro et al. |
| 2008/0319742 A1 | 12/2008 | Da Palma et al. |
| 2008/0319757 A1 | 12/2008 | Da Palma et al. |
| 2008/0319758 A1 | 12/2008 | Da Palma et al. |
| 2008/0319759 A1 | 12/2008 | Da Palma et al. |
| 2008/0319760 A1 | 12/2008 | Da Palma et al. |
| 2008/0319762 A1 | 12/2008 | Da Palma et al. |
| 2008/0320079 A1 | 12/2008 | Da Palma et al. |
| 2008/0320443 A1 | 12/2008 | Da Palma et al. |

OTHER PUBLICATIONS

Huang, C.M., et al., "Phone-Web: Accessing WWW using a telephone set", World Wide Web, vol. 2, No. 3, pp. 161-178, 1999.

Freier, J., et al., "WebViews: Accessing Personalized Web Content and Services", Proc. of 10th Int'l Conf. on WWW, Hong Kong, pp. 576-586, 2001.

Goose, S., et al., "Streaming speech3: a framework for generating and streaming 3D text-to-speech and audio presentations to wireless PDAs as specified using extensions to SMIL", Proc. of 11th Int'l. Conf. on WWW, Honolulu, HI, pp. 37-44, 2002.

Jieun, P., et al., "Conversational browser for accessing VoiceXML-based IVR services via multi-modal interactions on mobile devices", WSEAS Trans. on Computers, vol. 3, No. 1, pp. 85-91, Jan. 2004.

Capra III, R.G., et al., "Mobile refinding of web information using a voice interface: an exploratory study", Proc. of 2005 Latin American Conf. on Human-computer interaction, Cuernavaca, Mexico, pp. 88-99, 2005.

Chang, S.E., et al., "The implementation of a secure and pervasive multimodal Web system architecture", Inf. and Software Tech., vol. 48, No. 6, pp. 424-432, Jun. 2006.

"BLIKI", [online] Wikipedia [retrieved Feb. 23, 2007] retrieved from the Internet: <http://en.wikipedia.org/wiki/Bliki>.

"Cyn.in," [online] Cynapse [retrieved Feb. 23, 2007] retrieved from the Internet: <http://www.cynapse.com/cynin>.

DeMaria, M.J., "Searching For the Right Words", Network Computing, vol. 17, No. 22, pp. 26, 28, Oct. 26, 2006.

"Enterprise Bliki," [online] Wikipedia, [retrieved Feb. 23, 2007] retrieved from the Internet: http://en.wikipedia.org/wiki/Enterprise_bliki>.

Fielding, R., et al., "Principled Design of the Modern Web Architecture," ACM Trans. On Internet Technology, vol. 2, No. 2, May 2002, pp. 115-150.

Kolias, et al., "A Pervasive Wiki Application Based on VoiceXML," ACM, PETRA '08, Jul. 15-19, 2008.

Leseney, T., "Push-to-blog", Siemens AG, Oct. 2004.

Nottingham, M., et al., "Request for Comments (RFC) 4287: The Atom Syndication Format," The Internet Society, Dec. 2005, 43 pages.

Schaffert, et al., "IkeWiki: A Semantic Wiki for Collaborative Knowledge Management,"IEEE Int'l. Workshops on Enabling Technologies: Infrastructure for Collaborative Enterprises, 2006.

"SuiteTwo: Features", [online] Moveable Type, 2006 [retrieved Feb. 23, 2007] retrieved from the Internet: < http://suitetwo.com/features>.

Takami, et al., "A Study on the Architecture and Voice Dialog Scheme for a Personal Web Service in a Ubiquitous Communication Environment," IEEE, pp. 398-401, Jun. 2006.

"Wiki," [online] Wikipedia [retrieved Feb. 23, 2007] retrieved from the Internet: <http://en.wikipedia.org/wiki/Wiki>.

US Patent No. 7631104, Notice of Allowance, Jul. 29, 2009.

US Pub. No. 20080319758, Office Action 1, Jun. 9, 2010.

US Pub. No. 20080319762, Office Action 1, Jun. 11, 2010.

US Pub. No. 20080319760, Office Action 1, Jul. 12, 2010.

US Pub. No. 20080320079, Office Action 1, Jun. 30, 2010.

Fielding, R., et al., "Hypertext Transfer Protocol—HTTP/1.1," [online] Internet RFC 2616, The Internet Society, 1999, [retrieved Jul. 22, 2009] retrieved from the Internet: <http://www.w3.org/Protocols/rfc2616/rfc2616.html>.

O'Reilly, T., "What is Web 2.0," [online] O'Reilly Network, Sep. 30, 2005, [retrieved Nov. 25, 2008] retrieved from the Internet <http://www.oreillynet.com/pub/a/oreilly/tim/news/2005/09/30/what-is-web-20.html>.

* cited by examiner

SPEECH PROCESSING METHOD BASED UPON A REPRESENTATIONAL STATE TRANSFER (REST) ARCHITECTURE THAT USES WEB 2.0 CONCEPTS FOR SPEECH RESOURCE INTERFACES

CROSS-REFERENCE TO RELATED APPLICATIONS

This application is related to, and the teachings of which are incorporated herein by reference in their entirety, the following United States Applications for Patent entitled: "SPEECH PROCESSING SYSTEM BASED UPON A REPRESENTATIONAL STATE TRANSFER (REST) ARCHITECTURE THAT USES WEB 2.0 CONCEPTS FOR SPEECH RESOURCE INTERFACES", filed Jun. 20, 2007, assigned U.S. application Ser. No. 11/765,900; and "SPEECH-ENABLED APPLICATION THAT USES WEB 2.0 CONCEPTS TO INTERFACE WITH SPEECH ENGINES", filed Jun. 20, 2007, assigned U.S. application Ser. No. 11/765,962, both of which are assigned to the assignee of the present application.

BACKGROUND

1. Field of the Invention

The present invention relates to the field of speech processing technologies and, more particularly, to a speech processing method based upon REST architecture that uses Web 2.0 concepts for speech resource interfaces.

2. Description of the Related Art

In the past, companies having a Web presence thrived by providing as many people broad access to as much information as possible. Information flow was unidirectional, from a company to information consumers. As time has progressed, users have become inundated with too much information from too many sources. Successful Web sites began to provide user-facing information management and information filtration mechanisms designed to aid users in identifying information of interest. Even these Web sites were somewhat flawed in a sense that information still flowed in a unidirectional manner. A user was limited to information gathered and groomed by a particular information provider.

A new type of Web application began to emerge, which emphasized user interactions and two-way information exchange. These new Web applications operated more as information marketplaces where people shared information and not as information depots where users accessed a semi-static reservoir of information. This new Web and set of Web applications can be referred to as Web 2.0, where Web 2.0 signifies a second generation of Web based services and applications that emphasize online collaboration and information sharing among users. In other words, a Web 1.0 application would be one that was effectively read-only from a user perspective, where a Web 2.0 application would provide read, write, and update access to end-users. Web 2.0 users can fundamentally change a Web 2.0 application.

Specific examples of Web 2.0 instances include WIKIs, BLOGs, social networking sites, FOLKSONOMIEs, MASHUPs, and the like. All of these Web 2.0 instances allow end-users to add content, which other users are able to access. A value of a Web 2.0 Web site is enhanced by the user provided content and may even be completely dependent upon it.

For example, WIKIPEDIA (e.g., one Web 2.0 application) is a WIKI based encyclopedia where each end-user is able to view, add, and edit content. No content would exist without end-user contributions. Information accuracy results from an end-user population constantly updating erroneous entries which other users provide. As new innovations emerge, customers update and add WIKIPEDIA entries that describe these new innovations. Other examples of Web 2.0 applications include MYSPACE.com, YOUTUBE.com, DEL.I-CIO.US.com, CRAIGSLIST.com, and the like.

Currently, a schism exists between speech processing technologies and Web 2.0 applications, meaning that Web 2.0 instances do not generally incorporate speech processing technologies. One reason for this is that conventional interfaces to speech resources are too complex for an average end-user to utilize. For this reason, speech technologies are typically only available from Web sites/services that provide a unidirectional flow of information. For example, speech technologies are commonly used by enterprises to handle routine customer interactions via a telephone interface, such as providing bank balances and the like.

One problem contributing to the schism is that speech processing technologies are currently implemented using a non-uniform interface and the Web 2.0 is generally based upon a uniform interface. That is, speech processing operations are accessed via function calls, method invocations, remote procedure calls (RPC), and other messages that are only understood by a specific server or a small subset of components. A specific invocation mechanism and required parameters must be known by a client and must be integrated into an interface. A non-uniform interface is characteristic of RPC based techniques, which includes Simple Object Access Protocol (SOAP), Common Object Request Broker Architecture (COBRA), Distributed Component Object Model (DCOM), JINI, and the like. Without deliberate integration efforts, however, the chances that two software objects designed from an unconstrained architecture are near nil. At best, an ad hoc collection of software objects having vastly different interface requirements result from the RPC style architecture. The lack of uniform interfaces makes integrating speech processing capabilities for each RPC based application a unique endeavor fraught with application specific challenges which usually require significant speech processing design skills to overcome.

In contrast, a uniform interface exists that includes a few basic primitive commands (e.g., GET, PUT, POST, DELETE) that act upon targets, which in a Web 2.0 context are generally able to be referenced by Uniform Resource Identifiers (URIs). A term used for this type of architecture is Representational State Transfer (REST). REST based solutions simplify component implementation, reduce the complexity of connector semantics, improve the effectiveness of performance tuning, and increase the scalability of pure server components. The Web (e.g., hypertext technologies) in general is founded upon REST principles. Web 2.0 expands these REST principles to permit end users to add (HTTP PUT), update (HTTP POST), and remove (HTTP DELETE) content. Thus, WIKIs, BLOGs, FOLKSONOMIEs, MASH-UPs, and the like are all considered RESTful, since each generally follows REST principles.

What is needed to bridge the gap between speech processing resources and conventional Web 2.0 applications is a new paradigm for interfacing with speech processing resources, which makes speech processing resources more available to end-users. In this contemplated paradigm, end-users would optimally be able to cooperatively and dynamically develop speech-enabled solutions which the end-users would then be able to integrate into Web 2.0 content. Thus, a more robust Web 2.0 environment that incorporates speech processing technologies will be allowed to evolve. This is a stark contrast with a conventional paradigm for interfacing with speech processing resources, which is decisively non-RESTful in nature.

SUMMARY OF THE INVENTION

The present invention discloses a RESTful speech processing method that uses Web 2.0 concepts for interfacing with server-side speech resources. The RESTful speech processing method can be used to add customizable speech processing capabilities to Web 2.0 applications, such as WIKIs, BLOGs, social networking sites, FOLKSONOMIEs, MASHUPs, and the like. The invention can access speech-enabled applications via introspection documents. Each speech-enabled application can contain a collection of entries and resources. The entries can include Web 2.0 entries, such as WIKI entries and the resources can include speech resources, such as speech recognition, speech synthesis, speech identification, and voice interpreter resources. Each entry and resource can be further decomposed into sub-components specified at a lower granularity level. Each application resource/entry can be introspected, customized, replaced, added, re-ordered, and/or removed by end users.

The present invention can be implemented in accordance with numerous aspects consistent with the material presented herein. For example, one aspect of the present invention can include a method for using Web 2.0 as an interface to speech engines. In the method, a Web 2.0 server can serve at least one speech enabled application to at least one remotely located client. The Web 2.0 server can utilize a set of RESTful commands to interface with a server-side speech processing system which performs speech processing operations for the speech enabled application. The RESTful commands can include a GET, a PUT, a POST, and a DELETE command, each of which conform to an ATOM PUBLISHING PROTOCOL (APP) based protocol.

Another aspect of the present invention can include a method of performing speech processing operations based upon Web 2.0 type interfaces with speech engines. The method can include a step of interfacing with a Web 2.0 server from a standard browser. A speech-enabled application served by the Web 2.0 server can be accessed. The browser can render markup of the speech-enabled application. Speech input can be received from a user of the browser. A RESTful protocol can be utilized to access a remotely located speech engine. The speech processing engine can process the speech input and can provide results to the Web 2.0 server. The Web 2.0 server can perform a programmatic action based upon the provided results, which results in different content being presented in the browser.

Still another aspect of the present invention can include a method for providing speech-enabled applications based upon Web 2.0 concepts. In the method, a Web 2.0 server can serve at least one speech-enabled application to at least one standard browser. The speech-enabled application can include an introspection document, a collection of entries, and a collection of resources. At least one of the resources can be a speech resource associated with a speech engine. The speech-enabled application can conform to an APP based specification. The speech engine can perform speech processing operations for the speech-enabled application. The speech engine can be a turn-based speech processing engine executing within a JAVA 2 ENTERPRISE EDITION (J2EE) middleware environment.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
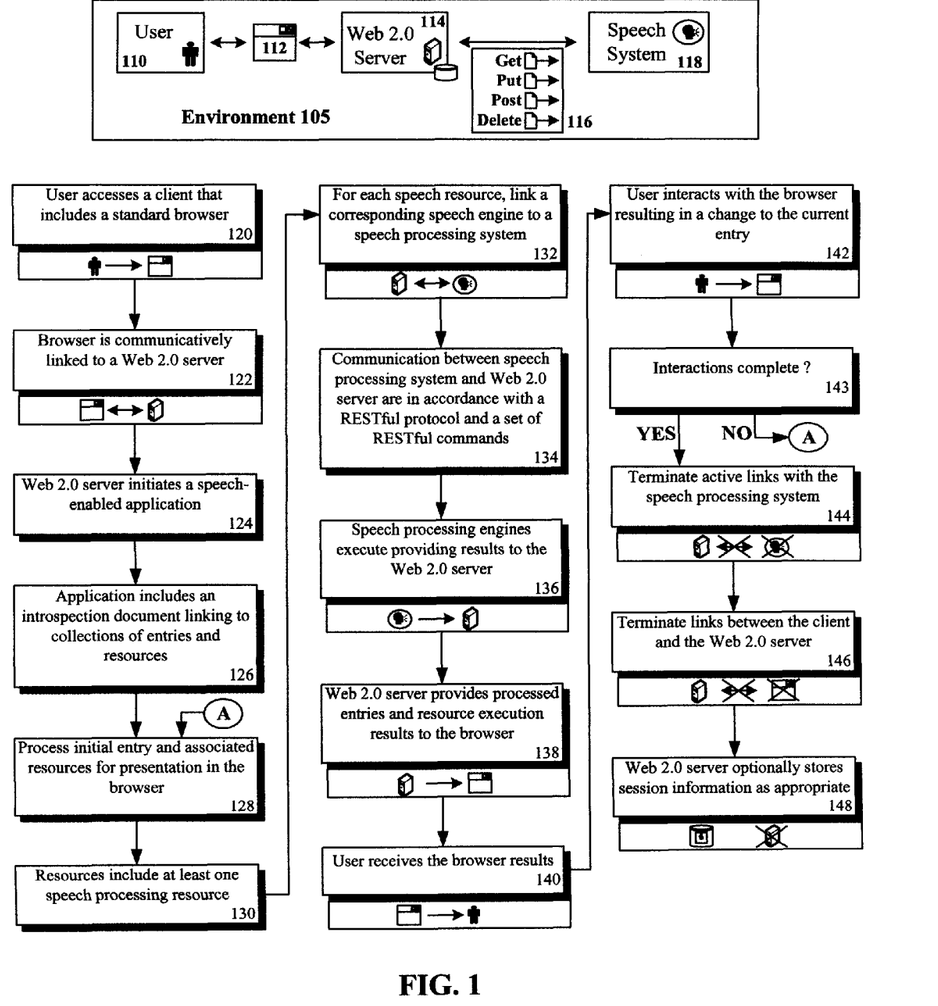
FIG. 1 is a flow diagram illustrating a method of using Web 2.0 as an interface to speech engines in accordance with an embodiment of the inventive arrangements disclosed herein

FIG. 1 is a flow diagram illustrating a method of using Web 2.0 as an interface to speech engines in accordance with an embodiment of the inventive arrangements disclosed herein. The method shown by steps 120-148 can be implemented in a context of a computing environment 105. In environment 105, a user 110 can utilize a browser 112 to access a Web 2.0 server 114. The Web 2.0 server can be a WIKI server, a BLOG server, a MASHUP server, a FOLKSONOMY server, a social networking server, and the like. A speech system 118 can include speech processing engines which can be accessed by the server 114 through use of a set of RESTful commands 116. The RESTful commands 116 can include GET, PUT, POST, and/or DELETE commands. There are no assumptions regarding the client upon which the browser 112 executes other than an ability to communicate with a Web 2.0 server 114.

In one embodiment, the speech-enabled applications served by server 114 can comply with the ATOM PUBLISHING PROTOCOL (APP) or other RESTful format. As such, the speech enabled application can be associated with an introspection document, and a collection of entries and resources. The resources can link the server 114 to the speech processing engines of system 118. End users 110 of environment 105 can be permitted to introspect, customize, add, re-order, and remove entries and resources of the collections.

The method of FIG. 1 can begin in step 120, where an end-user accesses a client that includes a standard browser. The browser can be a Web browser executing on the client or a voice browser executing upon a middleware server that the client accesses. In step 122, the browser can be communicatively linked to a Web 2.0 server. In step 124, the Web 2.0 server can initiate a speech-enabled application. The application can include an introspection document linking to collections of entries and resources, as shown in step 126.

In step 128, an initial entry and a set of associated resources can be processed for presentation in the browser. Step 130 indicates that these resources can include at least one speech processing resource. In step 132, for each speech resource, a link can be established to a corresponding speech engine of the speech processing system. In step 134, a communication can be established between the speech processing system and the Web 2.0 server. This communication can be in accordance with a RESTful protocol and a set of RESTful commands (e.g., GET, PUT, POST, and/or DELETE).

In step 136, the speech processing engines can execute requests, producing results which are sent to the Web 2.0 server. In step 138, the Web 2.0 server can provide processed entries and resource execution results to the browser. In step 140, the user can receive the results. The user can then interact with the browser, which results in a change to the current entry, as shown by step 142.

A determination can be made in step 143 as to whether further user browser interactions are to be handled. When additional user interactions exist, the method can loop from step 143 to step 128, where the entries and resources associated with the user specified interactions can be processed. When user interactions are complete in step 143, the method can proceed to step 144, where open connections and executing applications can be closed.

More specifically, in step 144, active links between the Web 2.0 server and the speech system can be terminated. In step 146, links between the client and the Web 2.0 server can be terminated. In step 148, the Web 2.0 server can optionally store session and state information concerning the user interaction as appropriate.

As used herein, Web 2.0 is a concept that refers to a cooperative Web in which end-users 110 add value by providing content, as opposed to Web systems that unidirectionally provide information from an information provider to an information consumer. In other words, Web 2.0 refers to a readable, writable, and updateable Web. While a myriad of types of Web 2.0 instances exists, some currently popular ones include WIKIs, BLOGS, MASHUPs, FOLKSONOMIEs, social networking sites, and the like.

REST refers to a Representational State Transfer architecture. A REST approach focuses on utilizing a constrained operation set (e.g. commands 116), such as GET, PUT, POST, and DELETE, to act against a set of structured targets, which can be URL addressable. A REST architecture is a client/server architecture which is stateless, cacheable, and layered by nature. REST replaces a paradigm of do-something with a make-something-so concept. That is, instead of attempting to execute a kind of state transition for a software object the REST concept changes a state of a software object to a user designated state. A RESTful object is one which primarily conforms to REST concepts. A RESTful interface (e.g., interface 112) can be a simple interface that transmits domain-specific data using a HyperText Transfer Protocol (HTTP) based protocol without utilizing an additional messaging layer, such as SOAP, and without reliance of session tracking HTTP cookies.

Figure 2:
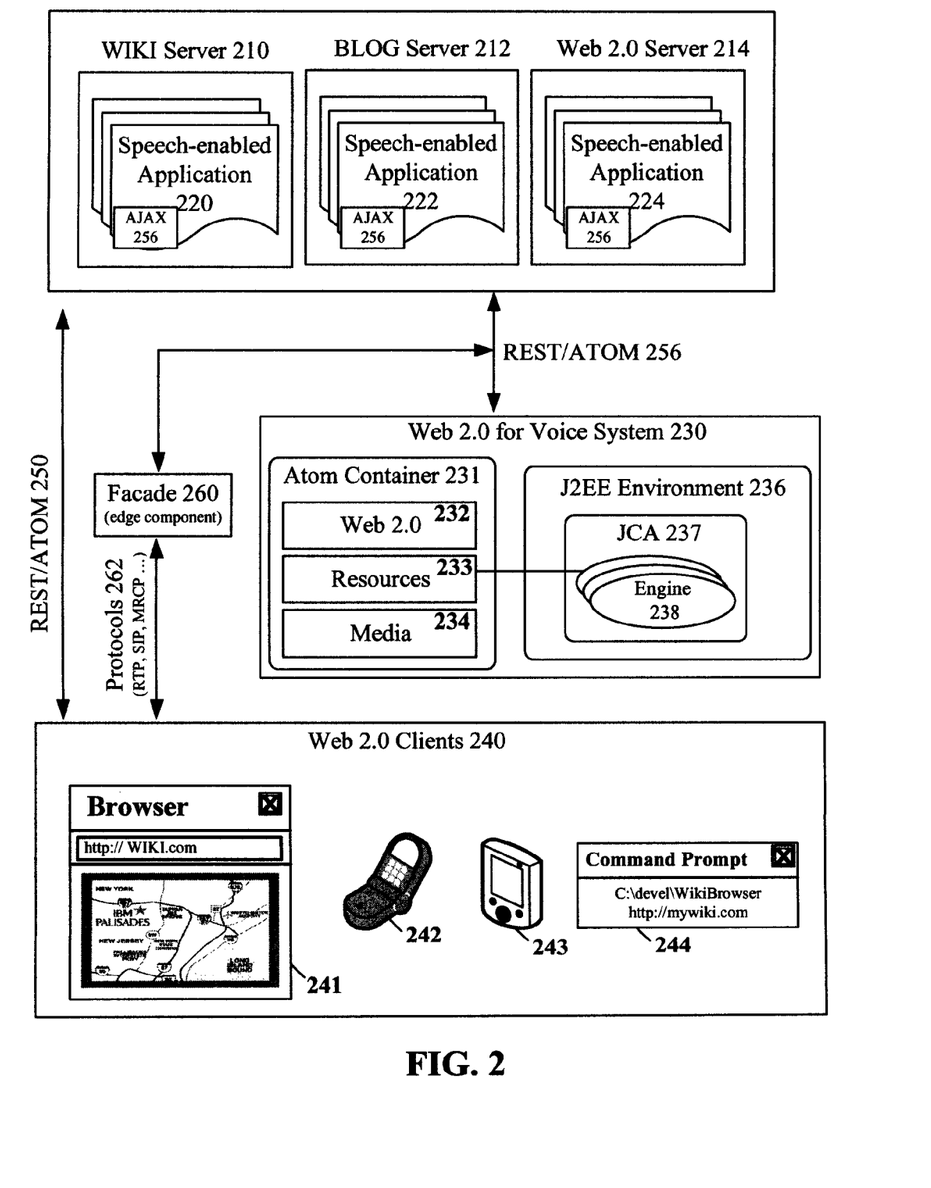
FIG. 2 is a schematic diagram of a system for a Web 2.0 for voice in accordance with an embodiment of the inventive arrangements disclosed herein.

FIG. 2 is a schematic diagram of a system 200 for a Web 2.0 for voice system 230 in accordance with an embodiment of the inventive arrangements disclosed herein. System 200 can be a system in which the method of FIG. 1 is performed. That is, system 200 can be one embodiment of components included in environment 105.

In system 200, Web 2.0 clients 240 can communicate with Web 2.0 servers 210-214 utilizing a REST/ATOM 250 protocol. The Web 2.0 servers 210-214 can serve one or more speech-enabled applications 220-224, where speech resources are provided by a Web 2.0 for Voice system 230. One or more of the applications 220-224 can include AJAX 256 or other JavaScript code. In one embodiment, the AJAX 256 code can be automatically converted from WIKI or other syntax by a transformer of a server 210-214.

Communications between the Web 2.0 servers 210-214 and system 230 can be in accordance with REST/ATOM 256 protocols. Each speech-enabled application 220-224 can be associated with an ATOM container 231, which specifies Web 2.0 items 232, resources 233, and media 234. One or more resource 233 can correspond to a speech engine 238.

The Web 2.0 clients 240 can be any client capable of interfacing with a Web 2.0 server 210-214. For example, the clients 240 can include a Web or voice browser 241 as well as any other type of interface 244, which executes upon a computing device. The computing device can include a mobile telephone 242, a mobile computer 243, a laptop, a media player, a desktop computer, a two-way radio, a line-based phone, and the like. Unlike conventional speech clients, the clients 240 need not have a speech-specific interface and instead only require a standard Web 2.0 interface. That is, there are no assumptions regarding the client 240 other than an ability to communicate with a Web 2.0 server 210-214 using Web 2.0 conventions.

The Web 2.0 servers 210-214 can be any server that provides Web 2.0 content to clients 240 and that provides speech processing capabilities through the Web 2.0 for voice system 230. The Web 2.0 servers can include a WIKI server 210, a BLOG server 212, a MASHUP server, a FOLKSONOMY server, a social networking server, and any other Web 2.0 server 214.

The Web 2.0 for voice system 230 can utilize Web 2.0 concepts to provide speech capabilities. A server-side interface is established between the voice system 230 and a set of Web 2.0 servers 210-214. Available speech resources can be introspected and discovered via introspection documents, which are one of the Web 2.0 items 232. Introspection can be in accordance with the APP specification or a similar protocol. The ability for dynamic configuration and installation is exposed to the servers 210-214 via the introspection document.

That is, access to Web 2.0 for voice system 230 can be through a Web 2.0 server that lets users (e.g., clients 240) provide their own customizations/personalizations. Appreciably, use of the APP 256 opens up the application interface to speech resources using Web 2.0, JAVA 2 ENTERPRISE EDITION (J2EE), WEBSPHERE APPLICATION SERVER (WAS), and other conventions, rather than being restricted to protocols, such as media resource control protocol (MRCP), real time streaming protocol (RTSP), or real time protocol (RTP).

A constrained set of RESTful commands can be used to interface with the Web 2.0 for voice system 230. RESTful commands can include a GET command, a POST command, a PUT command, and a DELETE command, each of which is able to be implemented as an HTTP command. As applied to speech, GET (e.g., HTTP GET) can return capabilities and elements that are modifiable. The GET command can also be used for submitting simplistic speech queries and for receiving query results.

The POST command can create media-related resources using speech engines 238. For example, the POST command can create an audio "file" from input text using a text-tospeech (TTS) resource 233 which is linked to a TTS engine 238. The POST command can create a text representation given an audio input, using an automatic speech recognition (ASR) resource 233 which is linked to an ASR engine 238. The POST command can create a score given an audio input, using a Speaker Identification and Verification (SIV) resource which is linked to a SIV engine 238. Any type of speech processing resource can be similarly accessed using the POST command.

The PUT command can be used to update configuration of speech resources (e.g., default voice-name, ASR or TTS language, TTS voice, media destination, media delivery type, etc.) The PUT command can also be used to add a resource or capability to a Web 2.0 server 210-214 (e.g. installing an SIV component). The DELETE command can remove a speech resource from a configuration. For example, the DELETE command can be used to uninstall a previously installed speech component.

The Web 2.0 for Voice system 230 is an extremely flexible solution that permits users (of clients 240) to customize numerous speech processing elements. Customizable speech processing elements can include speech resource availability, request characteristics, result characteristics, media characteristics, and the like. Speech resource availability can indicate whether a specific type of resource (e.g., ASR, TTS, SIV, Voice XML interpreter) is available. Request characteristics can refer to characteristics such as language, grammar, voice attributes, gender, rate of speech, and the like. The result characteristics can specify whether results are to be delivered synchronously or asynchronously. Result characteristics can alternatively indicate whether a listener for callback is to be supplied with results. Media characteristics can include input and output characteristics, which can vary from a URI reference to an RTP stream. The media characteristics can specify a codec (e.g., G711), a sample rate (e.g., 8 KHz to 22 KHz), and the like. In one configuration, the speech engines 238 can be provided from a J2EE environment 236, such as a WAS environment. This environment 236 can conform to a J2EE Connector Architecture (JCA) 237.

In one embodiment, a set of additional facades 260 can be utilized on top of Web 2.0 protocols to provide additional interface and protocol 262 options (e.g., MRCP, RTSP, RTP, Session Initiation Protocol (SIP), etc.) to the Web 2.0 for voice system 230. Use of facades 260 can enable legacy access/use of the Web 2.0 for voice system 230. The facades 260 can be designed to segment the protocol 262 from underlying details so that characteristics of the facade do not bleed through to speech implementation details. Functions, such as the WAS 6.1 channel framework or a JCA container, can be used to plug-in a protocol, which is not native to the J2EE environment 236. The media component 234 of the container 231 can be used to handle media storage, delivery, and format conversions as necessary. Facades 260 can be used for asynchronous or synchronous protocols 262.

Figure 3:
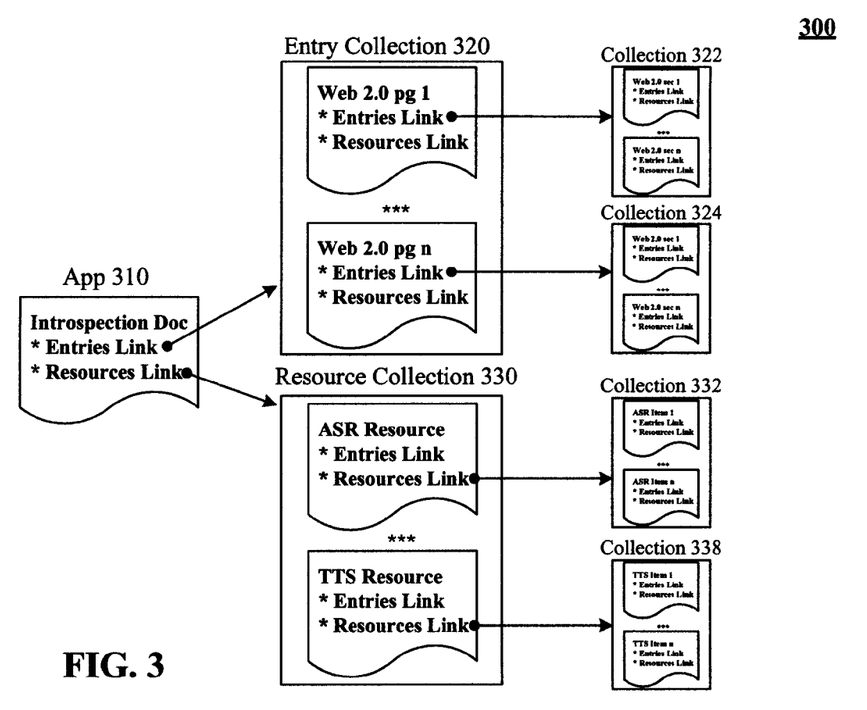
FIG. 3 is a schematic diagram of a speech-enabled application for use with a Web 2.0 for voice system in accordance with an embodiment of the inventive arrangements disclosed herein.

FIG. 3 is a schematic diagram of a speech-enabled application 300 for use with a Web 2.0 for voice system in accordance with an embodiment of the inventive arrangements disclosed herein. The speech enabled application 300 can be an application executable by Web 2.0 server 114 of FIG. 1 or a server 210-214 of FIG. 2.

The speech enabled application 300 can be written in a RESTful format in a syntax of any Web 2.0 application. For example, when the application 300 is a WIKI application, the syntax can be a WIKI syntax. When the application 300 is a BLOG, the syntax can be a BLOG syntax. The RESTful format can be an APP compliant format. The speech enabled application can have a root introspection document 310, which includes links to resources and collections.

The entry collection 320 can specify a set of served Web pages. Each entry page 320 can be further decomposed into collections 322 and 324 having a lower level of granularity such as WIKI page sections. The resources 330 can include speech processing resources and configuration specifics of these resources. Speech processing resources can include ASR resources, TTS resources SIV resources, voice interpreter resources, and the like. Each resource 330 can be further decomposed into configurable resource specifics 332 and 338. For example, the sub-resources 332 for an ASR resource 330 can include a grammar, a recognition language, and the like. When the resource 330 is a TTS resource, the sub-resources 338 can include a language, a rate of speech, a gender, a TTS type, and the like. The speech application elements 310-338 can be introspected, customized, replaced, added, re-ordered, or removed by end-users.

When user-customized applications 300 are initiated, an initial entry can be an authorizing entry. The authorizing entry can receive authorizing information from a user, which identifies the user, which in turn permits user specific customizations to be loaded. These customizations can apply to subsequent entries during a user interaction with the application 300.

Figure 4:
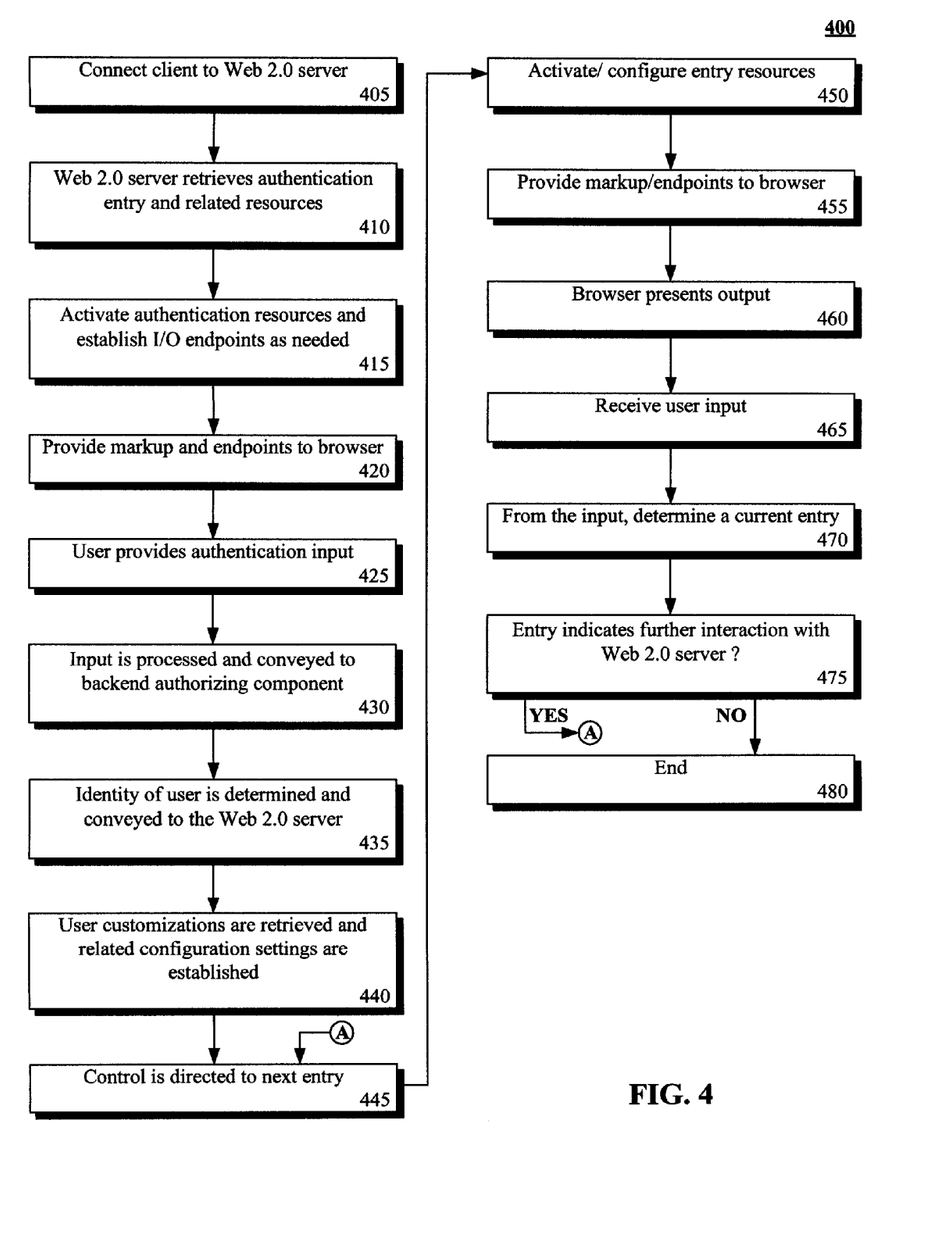
FIG. 4 is a flow chart of a method for using a speech-enabled application in accordance with an embodiment of the inventive arrangements disclosed herein.

FIG. 4 is a flow chart of a method 400 for using a speech-enabled application in accordance with an embodiment of the inventive arrangements disclosed herein. The method 400 can be performed in the context of a system 200 or an application 300.

The method 400 can begin in step 405, where a client is connected to a Web 2.0 server. Connecting to the Web 2.0 server can occur from a Web-based speech-enabled interface or from a voice-only interface, such as a telephone interface. Thus, step 405 can involve performing many different operations, depending upon connection specifics.

In an embodiment, where a Session Initiated Protocol (SIP) call is established, step 405 can cause a voice enabler (VE) to be invoked from a SIP INVITE message (in this embodiment the VE includes a call control component). Running a speech-enabled application can be indicated by a Uniform Resource Identifier (URI) corresponding to the application. A Sockets Direct Protocol (SDP) document can contain an RTP endpoint for audio output in a VOIP gateway. The VE can respond to the SIP INVITE with a "200 OK" response. The VE can issue an HTTP GET to find a first Web 2.0 page in the speech-enabled application. The VE can also indicate an RTP for input and output is desired. It can also provide the RTP endpoint obtained from the SDP. Then, the VE can encounter a link for a speech resource. The RTP endpoint can be communicated back to a component that has access to call control information of the SIP session. Appreciably, the interface for this component can be via a URL. The VE can then execute until the application ends, at which point the VE can issue a SIP BYE message to the caller to terminate the call.

In a different embodiment, a user interface can be a Web browser with a speech plug-in. No call control messages are necessary in such an embodiment. The Web browser can include an RTP or other plug-in for speech input/output. When the speech-enabled application is invoked, the RTP plug-in endpoint for audio output can be obtained from a Web 2.0 for voice system, such as the system 230 of system 200.

Regardless of connection specifics, the Web 2.0 server can retrieve an authentication entry and related resources in step 410. In step 415, the resources can be activated and input/output endpoints can be established as needed. For example, the authentication entry can utilize a SIV component to identify a user by speech characteristics. An input endpoint can be established so that user provided speech is conveyed to a SIV engine. For example, an RTP channel having a specified endpoint can be used to convey speech. In step 420, the endpoints and markup can be provided to the browser.

In step 425, the user of the browser can provide authentication input. In step 430, the input can be processed and conveyed to a backend authorizing component. In step 435, the identity of the user can be determined and once determined can be conveyed to the Web 2.0 server. In step 440, user customizations can be retrieved and related configuration settings can be established.

As the user interacts via the browser, control can shift from one Web 2.0 entry (i.e., Web page or section) to another, as shown in step 445. In step 450, entries and resources related to the current entry can be activated and/or configured. In step 455, markup and streaming/communication endpoints can be provided to the browser. In step 460, the browser can present output to the user. In step 465, the user can receive the input. In step 470, the user provided input can be used to determine a new APP entry of the application. In step 475, if the user selected entry indicates that a next interaction does not involve the Web 2.0 server, the method can proceed to step 480 where it ends. The method ending can indicate that the user proceeds with Web interactions unrelated to the speech-enabled application of method 400 in which case the method 400 can proceed from step 480 to step 405 (not shown). When the user interaction of step 475 indicates further interactions with the speech-enabled application, the method can loop to step 445, where control can be directed to the user selected entry.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for using Web 2.0 as an interface to speech engines comprising:
   serving at least one speech enabled application from a Web 2.0 server comprising hardware to at least one remotely located client comprising hardware; and
   the Web 2.0 server utilizing a set of RESTful commands to interface with a server-side speech processing system, which performs speech processing operations for the speech enabled application, wherein each of the RESTful commands is a command in conformance with Representational Sate Transfer (REST) principles.

2. The method of claim 1, wherein Web 2.0 server utilizes at least one introspection document for introspection and discovery of speech resources and to configure the speech resources.

3. The method of claim 2, wherein the introspection document and the RESTful commands conform to an Atom Publication Protocol (APP) based specification.

4. The method of claim 1, wherein the set of RESTful commands comprises a Hypertext Transfer Protocol (HTTP) GET command, an HTTP POST command, an HTTP PUT command, and an HTTP DELETE command.

5. The method of claim 1, wherein the set of RESTful commands consists of an HTTP GET command, an HTTP POST command, an HTTP PUT command, and an HTTP DELETE command.

6. The method of claim 1, wherein the RESTful commands comprise a GET command, said GET command selectively returning modifiable speech processing capabilities and elements.

7. The method of claim 1, wherein the RESTful commands comprise a GET command, said GET command selectively returning speech query results.

8. The method of claim 1, wherein the RESTful commands comprise a POST command, said POST command selectively providing input to a speech engine and returning output from the speech engine, said output being a processed result of the input.

9. The method of claim 8, wherein when the input is text the output is speech that has been text-to-speech converted from the inputted text, and wherein when the input is speech the output is text that has been speech-to-text converted from the inputted text.

10. The method of claim 8, wherein when the input is audio the output is text that has been speech-to-text converted from the inputted audio, and wherein when the input is text the output is audio that has been text-to-speech converted from the inputted text.

11. The method of claim 1, wherein the RESTful commands comprise a PUT command, said PUT command selectively updating speech resources for a configuration, said PUT command also selectively installing a speech resource for the configuration.

12. The method of claim 1, wherein the RESTful commands comprise a DELETE command, said DELETE command selectively removing at least one of a speech resource and a capability of a speech resource from a configuration.

13. A method of performing speech processing operations comprising:
   interfacing with a Web 2.0 server comprising hardware from a standard browser executing on a client comprising hardware;
   accessing a speech-enabled application served by the Web 2.0 server;
   the browser rendering markup of the speech-enabled application;
   receiving speech input from a user of the browser;
   utilizing a RESTful protocol to access a remotely located speech engine executing upon hardware, wherein the RESTful protocol is in conformance with Representational State Transfer (REST) principles;
   the speech engine processing the speech input and providing results to the Web 2.0 server; and the Web 2.0 server performing a programmatic action based upon the provided results, which results in different content being presented in the browser.

14. The method of claim 13, wherein the RESTful protocol is an Atom Publication Protocol (APP) based protocol, and wherein the speech-enabled application comprises an introspection document, a collection of entries, and a collection of resources each of which conforms to the Atom Publishing Protocol (APP) based protocol.

15. The method of claim 14, wherein the Web 2.0 server is configured so that end-users are able to introspect, customize, replace, add, re-order, and remove entries and resources in the collections.

16. The method of claim 13, wherein the speech-enabled application communicates with the speech engine using a set of RESTful commands, wherein said set of RESTful commands consists of a Hypertext Transfer Protocol (HTTP) GET command, an HTTP POST command, an HTTP PUT command, and an HTTP DELETE command wherein each of the RESTful commands is a command in conformance with Representational State Transfer (REST) principles.

17. The method of claim 13, wherein the Web 2.0 server is at least one of a WIKI server and a BLOG server, and wherein the speech engine is a turn-based speech processing engine executing within a JAVA 2 ENTERPRISE EDITION (J2EE) middleware environment.

18. The method of claim 13, further comprising:
prompting the user for authorizing information;
determining the user identity from the authorizing information;
ascertaining a set of user established speech processing parameters; and
configuring the speech-enabled application in accordance with the speech processing parameters, wherein the speech processing parameters specify at least one of speech resource availability, speech resource characteristics, and speech delivery characteristics.

19. A method for providing speech-enabled applications comprising:
serving at least one speech-enabled application from a Web 2.0 server comprising hardware to at least one standard browser executing upon a client comprising hardware, said speech-enabled application comprising an introspection document, a collection of entries, and a collection of resources, wherein at least one of the resources is a speech resource associated with a speech engine executing upon hardware, wherein the speech-enabled application conforms to an Atom Publication Protocol (APP) based specification; and
said speech engine performing speech processing operations for the speech-enabled application, wherein the speech engine is a turn-based speech processing engine executing within a JAVA 2 ENTERPRISE EDITION (J2EE) middleware environment.

20. The method of claim 19, wherein the speech-enabled application communicates with the speech engine using a set of RESTful commands, wherein said set of RESTful commands consists of a Hypertext Transfer Protocol (HTTP) GET command, an HTTP POST command, an HTTP PUT command, and an HTTP DELETE command, wherein each of the RESTful commands is a command in conformance with Representational State Transfer (REST) principles.

* * * * *